May 3, 1927.  G. H. BINDEMANN  1,627,140

POULTRY FOUNTAIN

Filed Nov. 3, 1926

G. H. Bindemann Inventor

By C. A. Snow & Co.
Attorneys.

UNITED STATES PATENT OFFICE.

GEORGE H. BINDEMANN, OF WAUSEON, OHIO.

POULTRY FOUNTAIN.

Application filed November 3, 1926. Serial No. 146,011.

This invention relates to a poultry fountain and aims to provide novel means whereby the water in a drinking trough may be replenished or replaced with fresh water, with facility.

Another object of the invention is to provide a device of this character which may be readily and easily cleaned, the parts thereof being removable.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
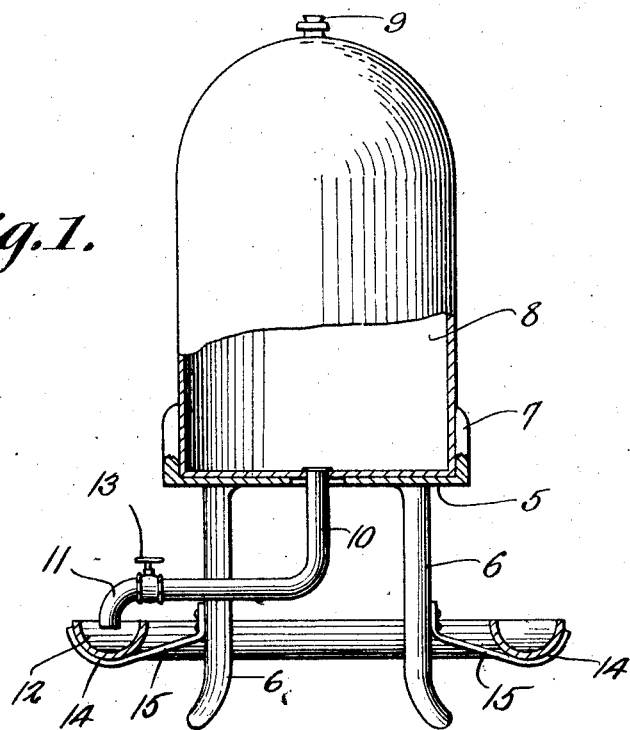
Figure 1 is an elevational view through a drinking fountain constructed in accordance with the invention, parts being shown in section.
Figure 2:
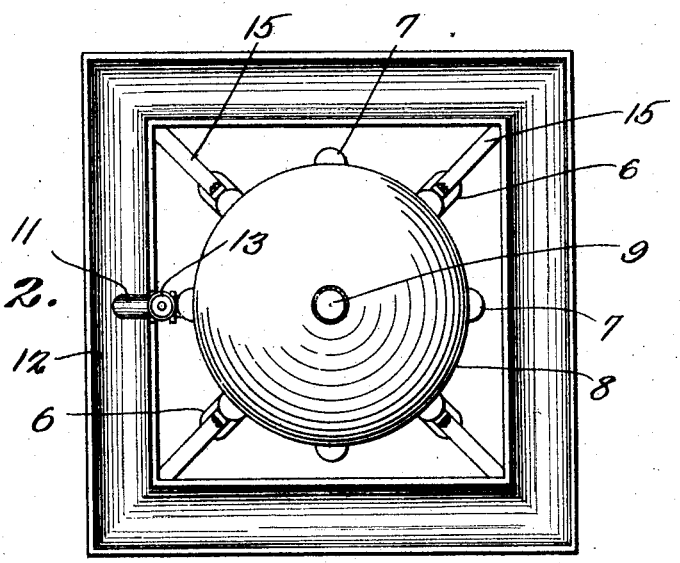
Figure 2 is a plan view of the fountain.

Referring to the drawing in detail, the device includes a support or stand embodying a base 5 to which the legs 6 are connected, whereby the base will be supported in spaced relation with the surface on which the container is standing.

Extending upwardly from the base are the supporting fingers 7 that are arranged in such relation with each other that they will embrace portions of the container 8, which is in the form of a bottle, the mouth thereof being closed by means of the stopper 9.

The reference character 10 indicates a feed pipe that has one end thereof extended into the container 8, the opposite end thereof extending outwardly and downwardly as at 11 to discharge water into the rectangular trough 12, the discharge end being normally submerged but when the water is used from the trough to uncover the discharge end thereof, air may enter to allow the supply of water to be replenished. A valve member 13 is positioned in the pipe to control the passage of water from the container 8 when it is desired to fill or replace the water in the trough, with fresh water, the valve being designed to regulate the supply of water for a particular use.

This trough 12 rests in the curved portions 14 of the arms 15 that are secured to the legs 6 and extend outwardly therefrom, the arms 15 being secured to the legs so that the trough will be properly supported to permit fowls to drink therefrom.

While I have shown and described the device as constructed for use in supplying drinking water to fowls, it is to be understood that it is within the scope of the invention to make such changes to permit the device to be used by larger animals such as hogs, horses, cows or the like.

I claim:

In a device of the character described, a support, upwardly extended fingers forming a part of the support, a container positioned on the support, legs forming a part of the support, arms extending outwardly from the legs and having curved extremities, a rectangular trough curved to conform to the curvature of the arms to rest in the curved portions of the arms, and means for delivering water to the trough.

In testimony that I claim the foregoing as my own, I have hereto affixed my signature.

GEORGE H. BINDEMANN.